US 11,193,611 B2

(12) United States Patent
DeWitt et al.

(10) Patent No.: US 11,193,611 B2
(45) Date of Patent: Dec. 7, 2021

(54) PIPE COUPLING APPARATUS (71) Applicant: Fernco, Inc., Davison, MI (US)

(72) Inventors: Donald James DeWitt, Davison, MI (US); Anthony John Dipzinski, Grand Blanc, MI (US)

(73) Assignee: FERNCO, INC., Davison, MI (US)

( * ) Notice: Subject to any disclaimer, the term of this patent is extended or adjusted under 35 U.S.C. 154(b) by 237 days.

(21) Appl. No.: 16/601,243

(22) Filed: Oct. 14, 2019

(65) Prior Publication Data
US 2021/0108744 A1 Apr. 15, 2021

(51) Int. Cl.
*F16L 21/00* (2006.01)
*F16L 21/06* (2006.01)

(52) U.S. Cl.
CPC .......... *F16L 21/002* (2013.01); *F16L 21/06* (2013.01)

(58) Field of Classification Search
CPC ....... F16L 21/00; F16L 21/002; F16L 21/005; F16L 21/06; F16L 21/065; F16L 25/14; F16L 27/10; F16L 27/107
USPC ....... 285/337, 236, 417, 418, 369, 372, 373, 285/419
See application file for complete search history.

(56) References Cited

U.S. PATENT DOCUMENTS

| 471,266 | A | | 3/1892 | Buscher | |
|---|---|---|---|---|---|
| 1,263,953 | A | | 4/1918 | Smyth | |
| 1,900,561 | A | | 3/1933 | Junggren | |
| 3,104,898 | A | | 9/1963 | MacDonald et al. | |
| 3,168,334 | A | * | 2/1965 | Glennd | F16L 27/107 285/55 |
| 3,228,713 | A | | 1/1966 | Frost | |
| 3,230,981 | A | * | 1/1966 | Levenetz | F16L 9/00 138/148 |
| 3,430,989 | A | | 3/1969 | Wendt | |
| 3,529,854 | A | * | 9/1970 | Thomas | F16L 21/005 285/322 |
| 3,647,247 | A | | 3/1972 | Pintard et al. | |
| 3,837,683 | A | * | 9/1974 | Taylor | F16L 21/005 285/236 |
| 3,933,377 | A | | 1/1976 | Arrowood | |
| 4,039,211 | A | | 8/1977 | Daspit | |
| 4,059,293 | A | * | 11/1977 | Sipler | F16L 27/11 285/236 |
| 4,101,151 | A | | 7/1978 | Ferguson | |
| 4,172,607 | A | | 10/1979 | Norton | |
| 4,381,020 | A | | 4/1983 | Daghe et al. | |
| 4,457,543 | A | * | 7/1984 | Justus | F16L 27/107 285/184 |
| 4,489,964 | A | | 12/1984 | Kipp et al. | |
| 4,564,220 | A | * | 1/1986 | Sills | F16L 21/005 285/236 |

(Continued)

FOREIGN PATENT DOCUMENTS

EP 1599690 B1 11/2005

*Primary Examiner* — Aaron M Dunwoody
(74) *Attorney, Agent, or Firm* — Dickinson Wright PLLC (57) ABSTRACT

A pipe coupling apparatus includes a flexible tubular body portion having a body portion a plurality of annular flanges projecting radially outward from the body portion and defining a plurality of annular recesses around the body portion. The body portion can be radially compressed at each end to different degrees, thereby allowing pipes with different diameters to be coupled. The body portion includes a plurality of rods disposed within the material of the body portion. When the ends of the body portion are compressed at different amounts, an intermediate portion of the body portion is tapered, and the rods bend. Clamp bands may be retained within the recesses and may provide the clamping force to radially compress the ends of the body portion to the desired amount.

20 Claims, 9 Drawing Sheets

(56) References Cited

U.S. PATENT DOCUMENTS

| | | | |
|---|---|---|---|
| 4,763,695 A | | 8/1988 | Dooley |
| 5,039,137 A | * | 8/1991 | Cankovic .............. F16L 21/005 |
| | | | 285/236 |
| 5,082,313 A | | 1/1992 | Bryant et al. |
| 5,174,613 A | * | 12/1992 | Joug .................... F16L 27/107 |
| | | | 285/229 |
| 5,193,859 A | * | 3/1993 | McKinnon ............ B29C 33/123 |
| | | | 285/236 |
| 5,232,250 A | | 8/1993 | Bonacci |
| 5,431,458 A | * | 7/1995 | Schaub ................. F16L 21/005 |
| | | | 285/236 |
| 5,630,629 A | | 5/1997 | Moessinger |
| 6,742,585 B1 | | 6/2004 | Braithwaite et al. |
| 7,083,203 B2 | | 8/2006 | Glaser et al. |
| 8,573,654 B2 | | 11/2013 | Kishi et al. |
| 8,651,532 B2 | | 2/2014 | Felber |
| 9,488,300 B2 | | 11/2016 | Kishi et al. |
| 9,599,262 B1 | | 3/2017 | Moore |
| 9,611,959 B2 | | 4/2017 | Hartmann et al. |
| 9,719,618 B2 | | 8/2017 | Kishi et al. |
| 9,765,911 B2 | | 9/2017 | Kenney et al. |
| 9,863,561 B2 | | 1/2018 | Chiproot |
| 10,156,305 B2 | | 12/2018 | Manning |
| 10,190,709 B2 | | 1/2019 | Delmar et al. |
| 2003/0079789 A1 | | 5/2003 | Egan et al. |
| 2009/0160183 A1 | * | 6/2009 | Felber .................... F16L 49/02 |
| | | | 285/148.26 |
| 2018/0274698 A1 | | 9/2018 | Huber |
| 2019/0219201 A1 | | 7/2019 | Goess-Saurau et al. |

\* cited by examiner

PIPE COUPLING APPARATUS

FIELD OF THE DISCLOSURE

The present disclosure relates to pipe couplings. More particularly, the present disclosure relates to a flexible pipe coupling with a reinforcing structure.

BACKGROUND OF THE DISCLOSURE

Pipes are in common use, and are often used to provide for the conveyance of material such as various fluids, including water, gasoline, natural gas, waste/sewer or the like. Pipes may also be used to provide a conduit or passageway for other non-flowing tangible material, such as electrical cables or telecommunication wires.

These pipes may be disposed in a variety of environmental conditions, both above ground and below ground. In many cases, pipes may be joined together in a butt-joint arrangement, with the ends of the pipes being brought together and joined. In some cases, the ends of the pipes include flanges that are bolted together, with a gasket ring disposed therebetween. In these cases, it is common for the pipes to have the same diameter and for the flanges to similarly have matching mounting surfaces between which a gasket may be disposed.

Accordingly, the pipes may be sealed at the joint therebetween by the gasket and the axial pressure applied at the flanges to compress the gasket. Thus, fluid flowing through the pipes may be sealed within the pipes, and the pipes are sealed against the intrusion of other matter. For example, in an above ground pipe, the sealing between the pipes blocks the intrusion of rain, snow, dirt, and other debris from entering the pipes and contaminating the fluid therein. Similarly, in a below ground installation, the sealing between the pipes blocks the intrusion of ground water, dirt, or other below ground debris. The sealing between the pipes further limits the fluid or other material from leaking out of the pipes and into the surrounding environment, whether above or below ground.

However, in some cases, the pipes being joined do not include boltable flanges. In many cases, the length of pipe is determined on-site and pipes are cut to fit the desired length. In other cases, pipes are manufactured without flanges. In this case, pipes may be joined by providing a tubular wrap or gasket material that may be wrapped around the interface between the pipes. Clamp bands may be used to compress the gasket and seal it against the end portions of the pipes. A separate sheath member may be disposed around the gasket, with the clamp bands compressing the sheath around the gasket. However, these arrangements can be cumbersome to install due to the separate sheath that is wrapped around the gasket. Moreover, this arrangement can be insufficient in accounting for axial and/or radial expansion of the gasket that may occur.

Additionally, such an arrangement may be limited to pipes having the same diameter due to the use of the sleeve that wraps around the gasket. In many cases, pipes to connect may have different diameters. In some cases, a tapered intermediate pipe may be disposed between pipes having different diameters, but such pipes are more costly to produce and present an additional component that must be installed.

In view of the above, improvements can be made to pipe coupling apparatuses.

SUMMARY

It is an object of the disclosure to provide a pipe coupling apparatus that can effectively seal a joint between two pipes.

It is a further object of the disclosure to provide a pipe coupling apparatus that can join pipes having different outer diameters.

It is a further object of the disclosure to provide a pipe coupling apparatus that is radially compressible.

It is a further object of the disclosure to provide a pipe coupling apparatus that is resistant to radial forces applied thereto.

It is a further object of the disclosure to provide a pipe coupling apparatus that is configured to maintain axial alignment between pipes that are coupled.

In accordance with these and other aspects, a pipe coupling apparatus is provided that includes a tubular body portion extending along a central axis from a first open end to a second open end to define an inner surface and an outer surface. The tubular body defines a plurality of axially extending cavities extending between the first and second open ends and disposed in circumferentially spaced relationship to one another. A plurality of rods extend axially through the tubular body portion and each are disposed in a respective one of the plurality of axially extending cavities. A plurality of annular flanges project radially outward from the outer surface of the tubular body portion to define a plurality of annular recesses disposed axially between adjacent ones of the plurality of annular flanges. The plurality of annular flanges include a first set of flanges disposed adjacent the first open end to define a first set of recesses and a second set of flanges disposed adjacent the second open end to define a second set of recesses. A plurality of clamping bands are disposed circumferentially around the tubular body portion and each are disposed in one of the plurality of annular recesses. Within each of the first set of recesses and the second set of recesses, a quantity of clamping bands is fewer than a quantity of recesses.

In one aspect, each of the first and second sets of annular flanges have a first flange disposed adjacent the first open end or the second open end, respectively, a second flange, a third flange, and a fourth flange, wherein the second flange is disposed axially inward relative to the first flange, the third flange is disposed axially inward relative to the second flange, and the fourth flange is disposed axially inward relative to the third flange. Each of the first and second set of recesses have a first recess, a second recess, and a third recess, wherein the first recess is disposed axially between the first flange and the second flange, the second recess is disposed axially between the second flange and the third flange, and the third recess is disposed axially between the third flange and the fourth flange.

In one aspect, a first clamping band of the plurality of clamping bands is disposed in the first recess and a second clamping band of the plurality of clamping bands is disposed in the third recess, and the second recess does not include a clamping band.

In one aspect, the plurality of clamping bands directly contact the outer surface of the tubular body portion.

In one aspect, the inner surface is substantially smooth and free from radial projections.

In one aspect, the rods are comprised of metal.

In one aspect, the tubular body portion has a nominal state and a compressed state, wherein in the compressed state an outer diameter of the tubular body portion is reduced relative to the nominal state.

In one aspect, in the compressed state, the outer diameter of the tubular body portion at one end is different than the outer diameter at the opposite end.

In one aspect, the plurality of rods are axially moveable relative to the plurality of cavities in response to radial compression of at least one end of the tubular body portion.

In one aspect, the second recess has a narrower axial width being less than a wider axial width of the first and second recesses.

In one aspect, each of the first and second sets of flanges include a fifth flange disposed axially inward relative to the fourth flange, and each of the first and second sets of recesses include a fourth recess disposed axially between the fourth flange and the fifth flange.

In one aspect, the fourth recess has an axial width being equal to the wider axial width of the first and second recesses, and a clamping band of the plurality of clamping bands is disposed within the fourth recess.

In one aspect, the plurality of flanges defines an intermediate recess disposed at an axial midpoint of the tubular body portion between the first and second sets of recesses, wherein the intermediate recess has an intermediate axial width that is greater than axial widths of the first, second, and third recesses, and wherein the tubular body portion tapers at the intermediate recess when one end of the tubular body portion is radially compressed a greater amount than the opposite end of the tubular body portion.

In another aspect, a pipe coupling apparatus is provided that includes a tubular body portion extending along a central axis from a first open end to a second open end to define an inner surface and an outer surface. The tubular body defines a plurality of axially extending cavities extending between the first and second open ends and disposed in circumferentially spaced relationship to one another. A plurality of rods extend axially through the tubular body portion and each are disposed in a respective one of the plurality of axially extending cavities. A plurality of annular flanges project radially outward from the outer surface of the tubular body portion to define a plurality of annular recesses disposed axially between adjacent ones of the plurality of annular flanges. The plurality of annular flanges include a first set of flanges disposed adjacent the first open end to define a first set of recesses and a second set of flanges disposed adjacent the second open end to define a second set of recesses. Each of the first and second set of recesses includes at least one narrow recess having a narrow axial width being less than a wider axial width of the remaining recesses in the respective set of recesses.

In one aspect, each of the first and second sets of annular flanges have a first flange disposed adjacent the first open end or the second open end, respectively, a second flange, a third flange, and a fourth flange, wherein the second flange is disposed axially inward relative to the first flange, the third flange is disposed axially inward relative to the second flange, and the fourth flange is disposed axially inward relative to the third flange. Each of the first and second set of recesses have a first recess, a second recess, and a third recess, wherein the first recess is disposed axially between the first flange and the second flange, the second recess is disposed axially between the second flange and the third flange, and the third recess is disposed axially between the third flange and the fourth flange.

In one aspect, the second recess in each of the first and second sets of recesses has the narrower width, and the first and third recesses have the wider axial width.

In one aspect, each of the first and second sets of flanges include a fifth flange disposed axially inward relative to the fourth flange, and each of the first and second sets of recesses include a fourth recess disposed axially between the fourth flange and the fifth flange, and the fourth recess has the wider axial width.

In one aspect, the plurality of flanges defines an intermediate recess disposed at an axial midpoint of the tubular body portion between the first and second sets of recesses, wherein the intermediate recess has an intermediate axial width that is greater than axial widths of the first, second, and third recesses.

In another aspect a method of coupling two pipes is provided including the steps of providing a first pipe having a first outer diameter and providing a second pipe having a second outer diameter. The method includes disposing a pipe coupling apparatus over ends of the first pipe and the second pipe, wherein the pipe coupling apparatus includes a tubular body portion having a central axis extending from a first open end to a second open end and a first and second end, the tubular body portion defining a plurality of cavities extending between the first and second open ends and disposed in circumferentially spaced relationship to one another, a plurality of rods extending axially through the body portion and each disposed within a respective one of the cavities, and a plurality of flanges extending radially outward from the body portion to define a plurality of recesses axially therebetween. The method further includes tightening at least a first clamp and radially compressing the first end of the tubular body portion against the end of the first pipe and tightening at least a second clamp and radially compressing the second end of the tubular body portion against the end of the second pipe. The first and second clamps are disposed within a corresponding recess of the plurality of recesses, and at least one of the recesses of the plurality of recesses does not include a clamp.

In one aspect, the plurality of rods bend and an intermediate portion of the tubular body portion is tapered when the first end is radially compressed a greater amount relative to the second end.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION OF THE ENABLING EMBODIMENTS

With reference to FIGS. 1 and 3-5, a pipe coupling apparatus 10 is generally shown and extends from a first end 12 to a second end 14 along a central axis A extending longitudinally through the center of the pipe coupling apparatus 10. The pipe coupling apparatus 10 includes a tubular body portion 16 extending between the first and second ends 12, 14. The pipe coupling apparatus 10 further includes a plurality of axially extending rods 17 disposed within the body portion 16.

The body portion 16 defines a passageway 18 extending therethrough. The passageway 18 is delimited by an inner surface 20. The body portion 16 is defined radially between the inner surface 20 and an outer surface 22. A plurality of annular flanges 24 extend radially outward from the outer surface 22. The annular flanges 24 define a plurality of annular recesses 26 surrounding the body portion 16.

The tubular body portion 16 has a generally tubular shape that extends along the axis A. The tubular body portion 16 may be rotationally symmetrical about the axis A, having a generally constant thickness at various axial locations along the tubular body portion 16. The tubular body portion 16 may extend around the axis A in an "endless" arrangement, such that the tubular body portion 16 does not include an axially extending seam or circumferential ends. Put another way, the tubular body portion 16 may be formed as a tube or may be formed as flat member that is rolled and then fixedly joined to define a seamless tubular shape. Accordingly, the tubular body portion 16 does not have circumferential ends that overlap.

The tubular body portion 16 may be made of a flexible and resilient material, such as rubber or flexible PVC (such as black flexible PVC, 60 shore A). The specific material composition of the tubular body portion 16 may vary, however, and it will be appreciated that the specific material for the tubular body portion 16 may be chosen to suit the needs of the user, with such material being capable of satisfying the structure and function described herein.

Figure 4A:
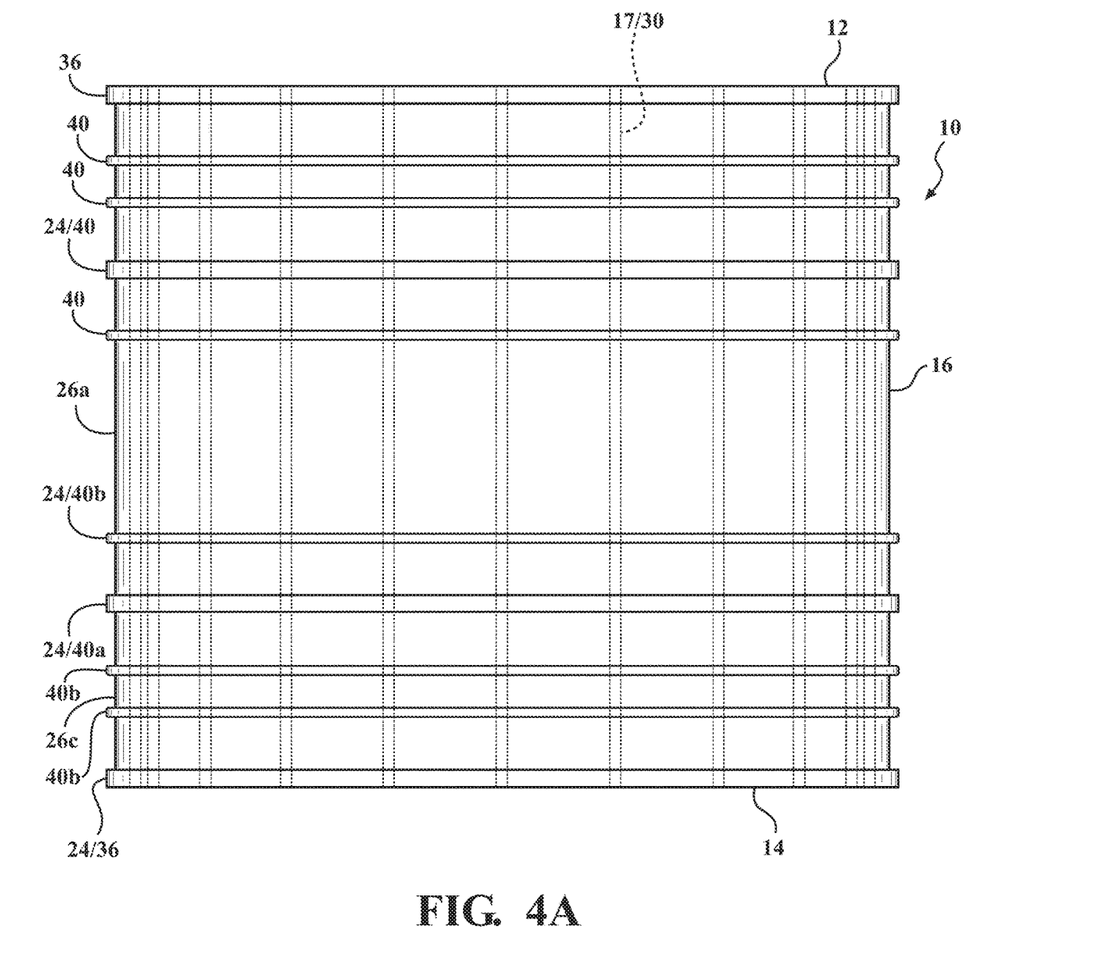
FIG. 4A is a side view of the pipe coupling apparatus illustrating rods in hidden line extending axially through the tubular body portion.

As described above, the tubular body portion 16 defines the inner surface 20 and the outer surface 22. The body portion 16 may include and define a plurality of axial cavities 30 extending the length of the body portion 16. The axial cavities 30 are disposed within the material of the body portion 16 and disposed radially between the inner surface 20 and the outer surface 22. The axial cavities 30 are not open to the inner surface 20 or the outer surface 22. Thus, the axial cavities 30 are not visible when viewed from the front/side of the body portion 16. For example, in FIG. 4, the cavities 30 are only visible in hidden lines.

In one aspect, the axial cavities 30 may be evenly circumferentially distributed around the body portion 16, such that the circumferential spacing between adjacent axial cavities is generally the same. In another aspect, the axial cavities 30 may be unevenly distributed around the body portion 16, such that the spacing between axial cavities may be different at different circumferential locations.

The axial cavities 30 may be open at each axial end thereof, such that the axial cavities 30 may be accessible in the axial direction. Put another way, the axial cavities 30 extend fully axially through the body portion 16.

In another aspect, the axial cavities 30 may be open at only one axial end, with the opposite axial end being closed. In this aspect, each of the axial cavities 30 may be open at the same end of the body portion 16 and closed at the same end of the body portion 16. In another aspect, a portion of the plurality of the axial cavities 30 may be open at one end, with the other axial cavities 30 being open at the opposite end. In one aspect, half of the axial cavities 30 may be open at one end, with the other half being open at the opposite end. In another aspect, fewer than half of the axial cavities 30 may be open at one end, and the remainder of the axial cavities 30 may be open at the opposite end. In one aspect, circumferentially adjacent axial cavities may alternate being open and closed at one end, with the opposite ends correspondingly alternating at the opposite end. In another aspect, more than one circumferentially adjacent cavities 30 may be open at one end, followed by one or more cavities that are closed at that end. In another aspect, some of the cavities 30 may extend fully through the body portion 16, while others are only open at one end. It will be appreciated that various alterations of which cavities 30 extend fully through and which cavities are open at one end.

In another aspect, the cavities 30 may be closed at both ends, with one or both of the ends being filled with a curing material or adhesive, such that an end that was initially open may be closed by inserting such curing material or adhesive.

As described above, the pipe coupling apparatus 10 includes the plurality of axially extending rods 17 disposed within the body portion 16. The rods 17 are disposed, at least partially, within the cavities 30. In one aspect, the rods 17 are made of metal, for example aluminum or 304SS stainless steel.

In one aspect, the rods 17 have a circular cross-section defining a diameter. However, it will be appreciated that other outer profiles and cross-sectional shapes may be used, such as a square or other polygonal shape. In one example, the diameter of the rods 17 is 0.156 inches. However, other sizes can be used depending on the needs of the user regarding flexibility and stiffness of the tubular body portion 16 as well as the selected size and thickness of the tubular body portion 16. In one aspect, the rods 17 are solid. In one aspect, the rods 17 have a longitudinal length that is less than the longitudinal length of the tubular body portion 16. In one aspect, the rods 17 are disposed entirely within a corresponding one of the cavities 30, such that the ends of the rods 17 are disposed at or axially inward from the ends of the tubular body portion 16.

In one aspect, the rods 17 have a length corresponding to the length of the tubular body portion 16. In this aspect, the rods 17 may be disposed entirely within the cavities 30, such that the ends of the rods 17 are disposed at the ends of the tubular body portion 16.

In another aspect, one or both of the ends of the rods 17 may extend axially outward from the end or ends of the tubular body portion 16, such that the rods 17 are only partially disposed within the tubular body portion 16, with a portion of the rod 17 being exposed. In one aspect, the rods 17 are longer than the length of the tubular body portion 16. In aspect, one end of the rod 17 is disposed at or axially inward from one end of the tubular body portion 16, with the opposite end of the rod 17 being exposed and extending beyond the end of the tubular body portion 16. In one aspect, both ends of the rod 17 are exposed and extend axially outward from both ends of the tubular body portion 16.

In one aspect, the rods 17 are sized such that they have the same width or diameter as the cavities 30. In another aspect, the rods 17 are slightly smaller than the cavities 30 such that the rods 17 may more easily shift axially along the tubular body portion 16. In another aspect, the rods 17 are slightly larger than the cavities 30, such that the rods 17 are more frictionally retained within the cavities 30. The rods 17 may also be knurled to promote retention within the cavities.

In one aspect, the relative size of the rods 17 and the cavities 30 may vary around the circumference of the tubular body portion 16, with some rods 17 being smaller than the cavities 30 and others being larger or matching the size of the cavities 30. In one aspect, the rods 17 may have the same size around the tubular body portion 16, and the size of the cavities 30 may vary. In another aspect, the rods 17 may have varying sizes and the cavities 30 may be the same size. In another aspect, both the sizes of the rods 17 and the sizes of the cavities 30 may vary. In one aspect, the rods 17 may include an upset or other structural feature to promote or more specifically control bending at a specific location.

The rods 17 may be bonded to the body portion 16 within the cavity along their length. In another aspect, the rods 17 may be bonded to the body portion 16 within the cavity 30 at distinct locations. In another aspect, the rods 17 may be free from bonding or other fixing mechanism such as adhesive. When bonded within the cavities 30, the rods 17 may be limited due to the bonding from moving relative to the cavities 30 at the location of the bonding. Accordingly, when it is desirable for the rods 17 to be permitted to move or shift within the cavities 30, bonding may be excluded or limited to a single distinct location.

As described above, the tubular body portion 16 may include the plurality of annular flanges 24 that extend radially outward on the outer surface 22 of the body portion 16.

The annular flanges 24 may extend fully around the circumference of the tubular body portion 16 to define a closed loop. In one aspect, the annular flanges 24 each define a unitary structure extending fully around the circumference of the tubular body portion 16. In one aspect, the annular flanges 24 and the tubular body portion 16 combine to define a single unitary structure that may be co-extruded or co-molded to define a single unitary and homogenous structure.

In another aspect, one or more of the annular flanges 24 may be defined by a plurality of segments that are spaced apart circumferentially, defining a circumferentially extending crenel-and-merlon arrangement. In this aspect, the annular flange(s) 24 having this arrangement are not circumferentially continuous, but are still disposed fully around the circumference of the tubular body portion 16. In one aspect, the segments making up the annular flange(s) 24 are evenly spaced apart. In one aspect, the circumferential space between the segments is less than the circumferential length of the segments. In another aspect, the space between segments is the same as the length of the segments. In another aspect, the space between segments is larger than the length of the segments.

For purposes of the discussion, the annular flanges 24 shown in the figures that extend fully and continuously around the circumference of the tubular body portion 16 will be described.

Figure 1:
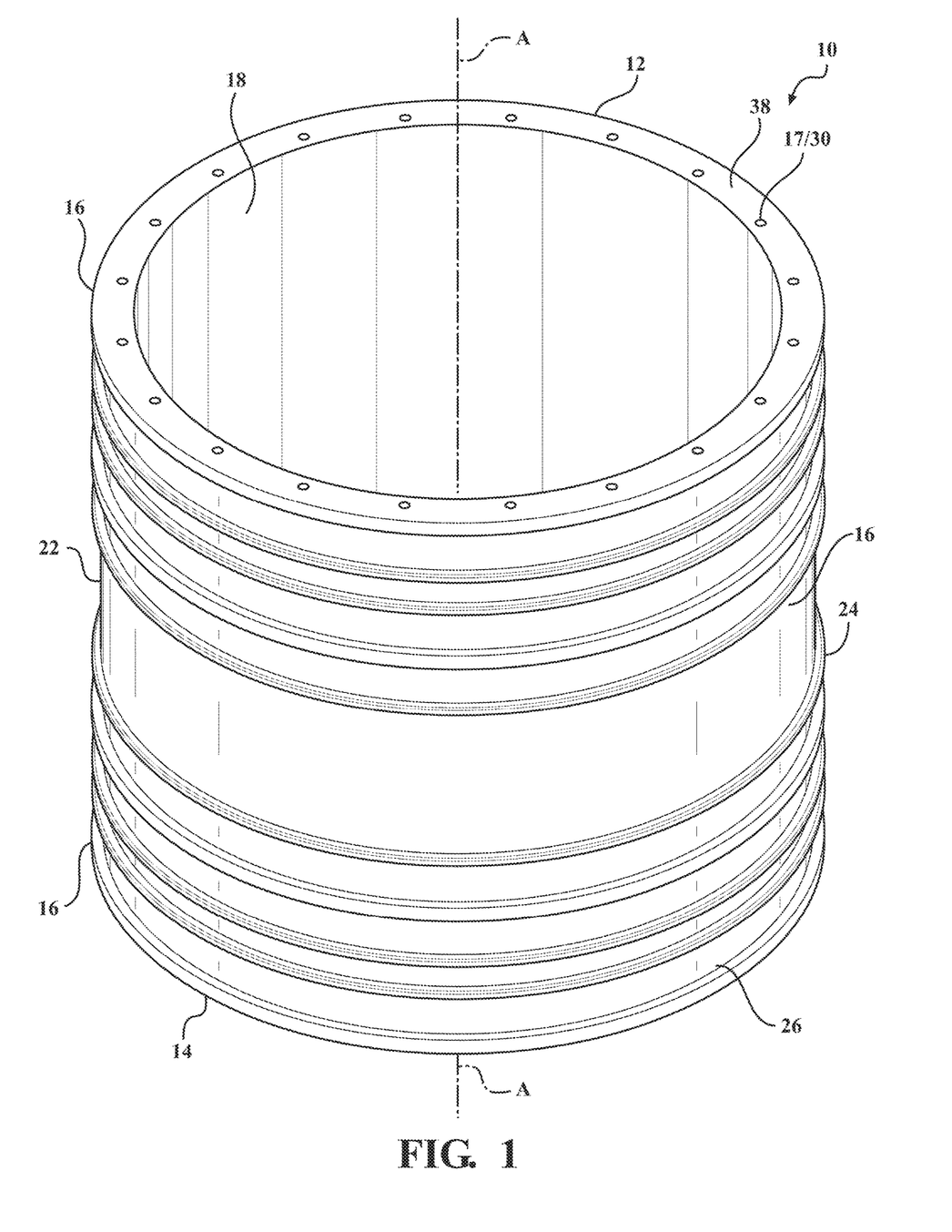
FIG. 1 is a perspective view of a pipe coupling apparatus having a tubular body portion.
Figure 2:
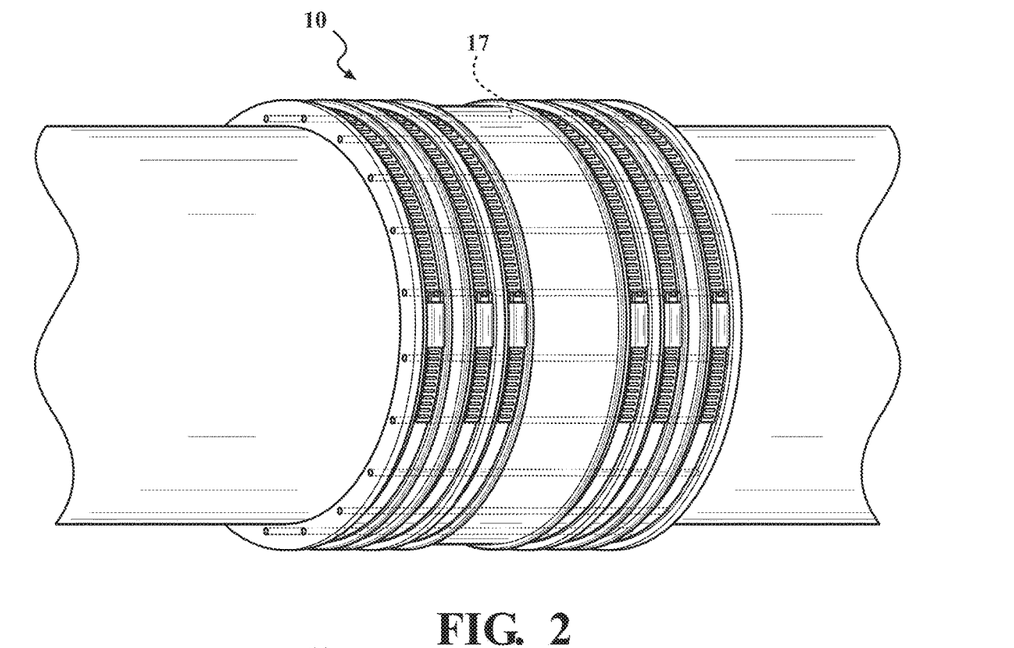
FIG. 2 is a perspective view of the pipe coupling apparatus connecting two pipes having similar diameters.
Figure 4B:
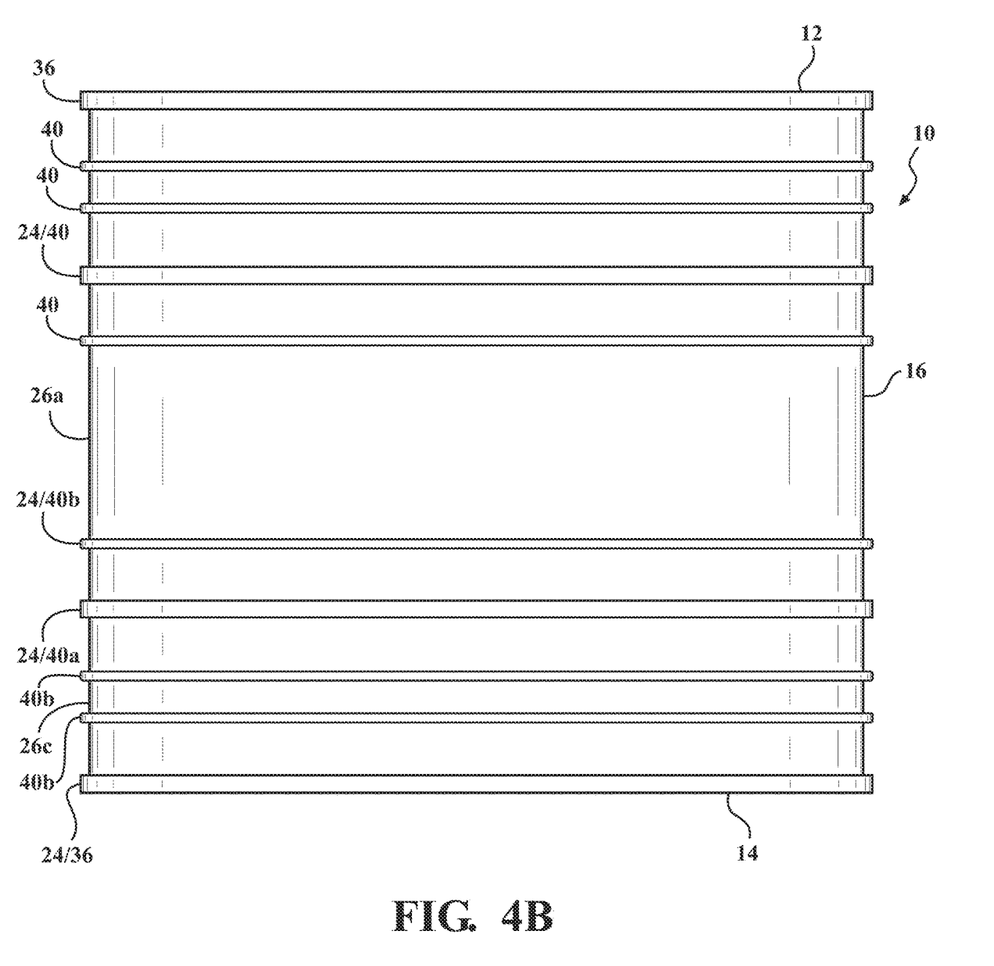
FIG. 4B is a side view of the pipe coupling apparatus.

In one aspect, the tubular body portion 16 may include ten annular flanges 24, as shown in FIGS. 1 and 4. A pair of flanges 24 may be disposed at the terminal ends of the tubular body portion 16. These flanges 24 may be referred to as end flanges 36. The end flanges 36 that extend radially outward and circumferentially around the tubular body portion 16 thereby combine with the body portion to define a pair of end faces 38 that face axially outward from the tubular body portion 16. The end faces 38 include the openings of the cavities 30, which may be radially closer to the radially inner edge of the end faces 38 than the radially outer edge of the end faces 38. The openings of the cavities 30 are arranged in this manner because the end flanges 36 project radially from the body portion 16, and the cavities 30 extend through the material of the body portion 16.

Some of the annular flanges 24 may be disposed axially inward from the end flanges 36, and may be referred to as axially inner flanges or inner flanges 40. The inner flanges 40 may have different axial thicknesses, such that they may be either a thick flange 40a or a thin flange 40b. However, in another aspect, the inner flanges 40 may have the same axial thickness.

In one aspect, the thick flanges 40a may be approximately the same axial thickness as the end flanges 36. In one aspect, the end flanges 36 and the thick flanges 40b may be 0.25 inches thick. In another aspect, the thick flanges 40b may have a different thickness than the end flanges 36, and may be either thicker or thinner than the end flanges 36. The thin flanges 40b, in one aspect, may be 0.15 inches thick.

In one aspect, the number, arrangement, and size of flanges 24 may vary depending on the overall size of the tubular body portion 16. In one approach, a tubular body portion 16 with a larger diameter and configured for use on larger pipes may include more flanges than a tubular body portion 16 with a smaller diameter and configured for use on smaller pipes. However, it will also be appreciated that the total number of flanges 24 may vary depending on the needs of the user, and that in some cases flanges 24 may be included that are not "used."

The flanges 24 disposed on the tubular body portion 16, as described above, define the plurality of recesses 26 surrounding the body portion 16. These recesses 26 may be used to axially retain a plurality of clamp bands 50 (shown in FIGS. 6-8) that surround the tubular body portion 16 and are operable to provide a radially inward clamping force on the outside of the tubular body portion 16 to seal the tubular body portion 16 against the pipes that it is coupling.

Figure 5:
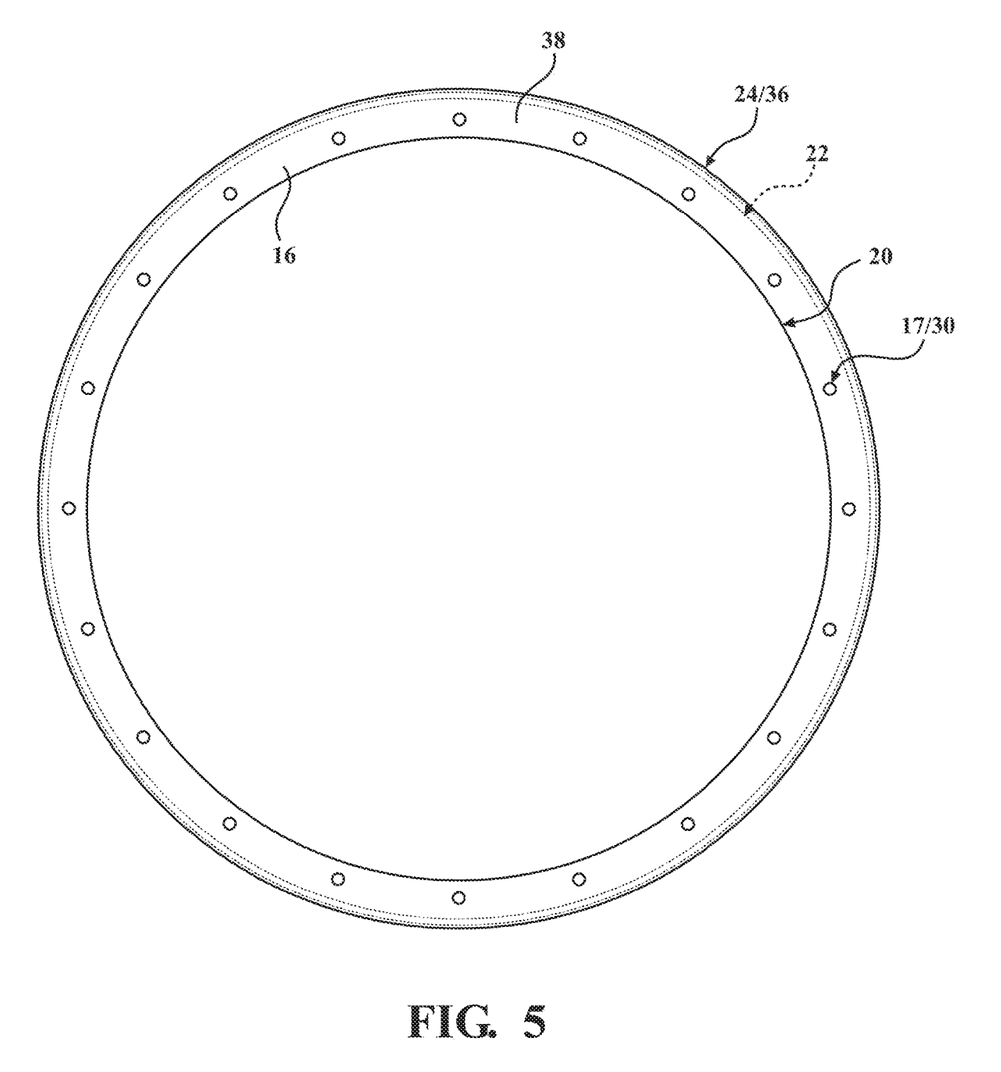
FIG. 5 is an end view of the pipe coupling apparatus.

In one example, shown in FIGS. 1, 4, and 5 the tubular body portion 16 is a relatively "large" tubular body portion 16 configured for use with larger pipes. In this example, the tubular body portion 16 may have an inner diameter of about 10.00 inches. The tubular body portion 16 may have an outermost diameter of 11.30 inches, as measured at the outermost surface of the flanges 24. The tubular body portion 16 may further include an outer diameter that is 11.00 inches. Thus, the radial height of the flanges 24 may be 0.30 inches. The end flanges 36 may have an axial thickness of 0.25 inches. The tubular body portion 16 may include eight inner flanges 40, with two of the inner flanges 40 being thick flanges 40a and six being thin flanges 40b. A pair of thin flanges 40b may be disposed between one of the thick flanges 40a and the end flange 36, with another pair of thin flanges 40a being disposed between the other thick flange 40a and the other end flange 36. Thus, a middle pair of thin flanges 40b may be disposed between the two thick flanges 40a. The thick flanges 40a may be 0.25 inches thick, with the thin flanges being 0.15 inches thick. It will be appreciated that these sizes are examples, and that the height and/or width may be modified.

The inner flanges 40 may be split into two sets of four, with each set of four being associated with one of the end flanges 36, thereby defining two sets of five flanges 24. Each set of five flanges 24 may thereby define four of the recesses 26. An intermediate recess 26a may be disposed at the axial middle of the tubular body portion 16 and, axially between the two sets of five flanges 24. The intermediate recess 26a may also be referred to as an intermediate/middle portion or intermediate/middle section.

Within each set of five flanges 24 and the four recesses 26 defined by the flanges, the recesses 26 may have different axial widths. The recesses 26 may be either wide recesses 26*b* or narrow recesses 26*c*. The wide recesses 26*b* may be sized and arranged to accommodate one of the clamp bands 50. In one example, the wide recesses 26*b* may be 0.75 inches wide, and the narrow recesses 26*c* may be 0.45 inches wide. The intermediate recess 26*a* may be 2.70 inches wide. The overall axial length of the tubular body portion 16 may be 10.00 inches. Of course, other relative dimensions may be used.

As shown in FIGS. 1 and 4, the wide recesses 26*b* may be defined between one narrow flange 40*b* and one wide flange 40*a* or end flange 36. The narrow recesses 26*c* may be defined between a pair of narrow flanges 40*b*. The intermediate recess 26*a* is also defined between a pair of narrow flanges 40*a*.

Each of the above described flanges 24 have a generally box-like cross-section projecting from the surface of the body portion 16. However, it will be appreciated that the corners of the box-like shape are not precisely sharp. In one aspect, the outer corners of the flanges 24 have an outer radius of 0.03 inches.

Figure 6:
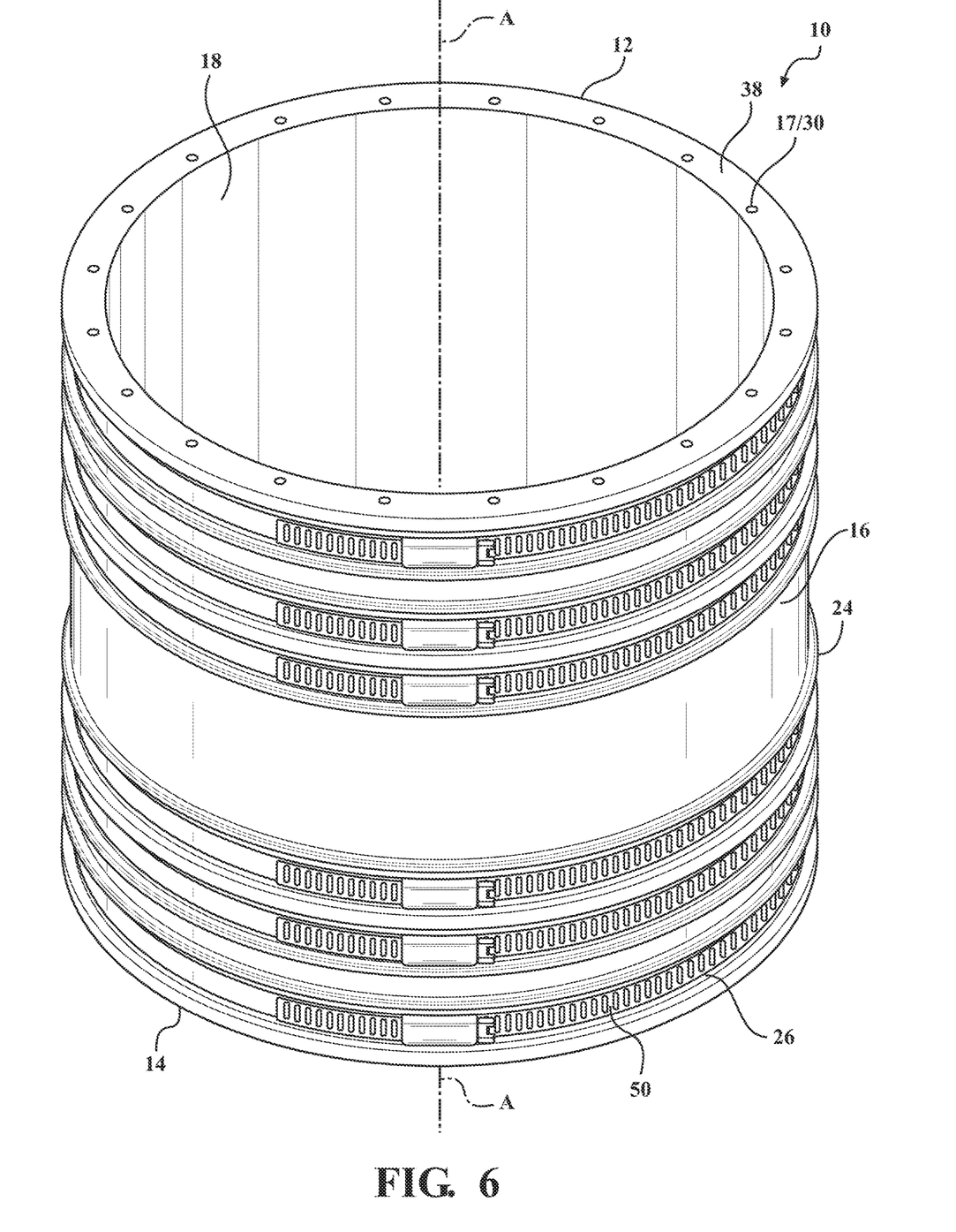
FIG. 6 is a perspective view of the pipe coupling apparatus including clamp bands.
Figure 7A:
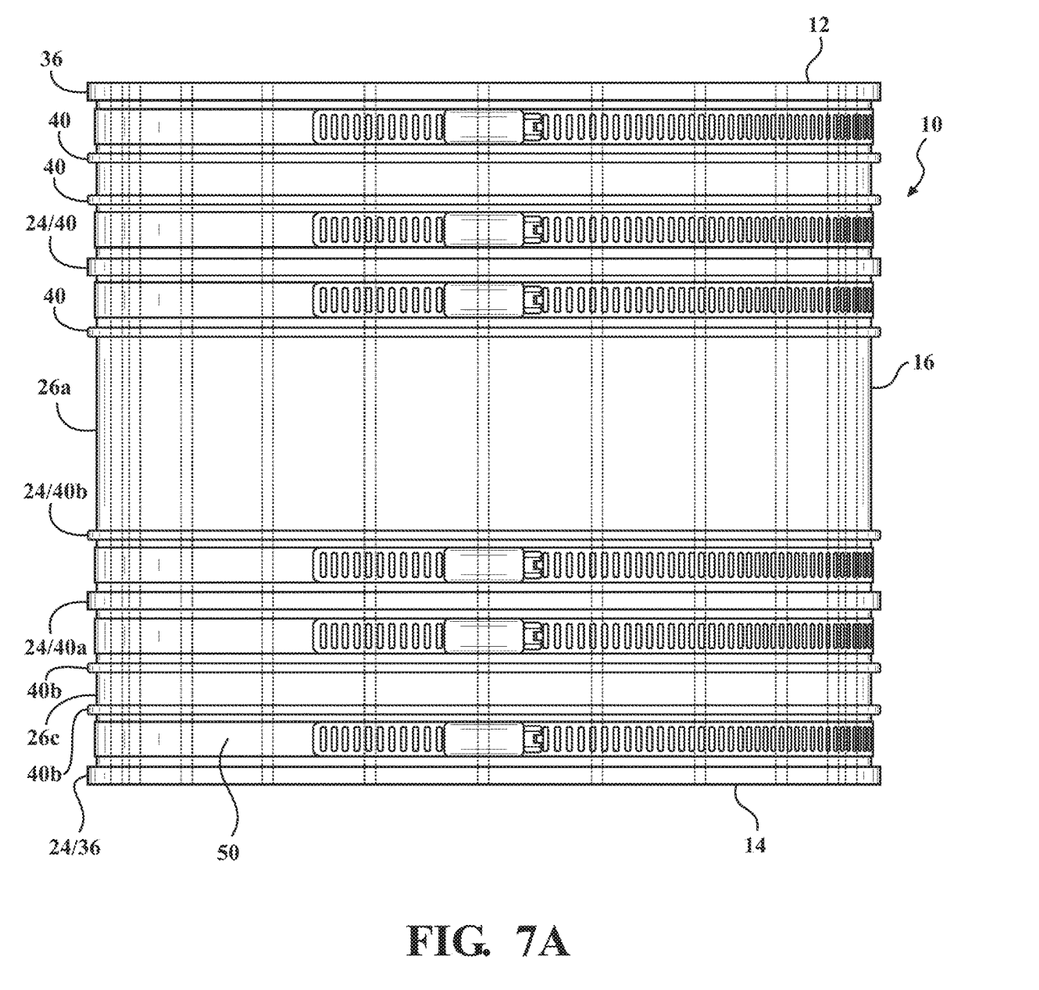
FIG. 7A is a side view of the pipe coupling apparatus including clamp bands, and illustrating rods in hidden line extending through the tubular body portion.
Figure 7B:
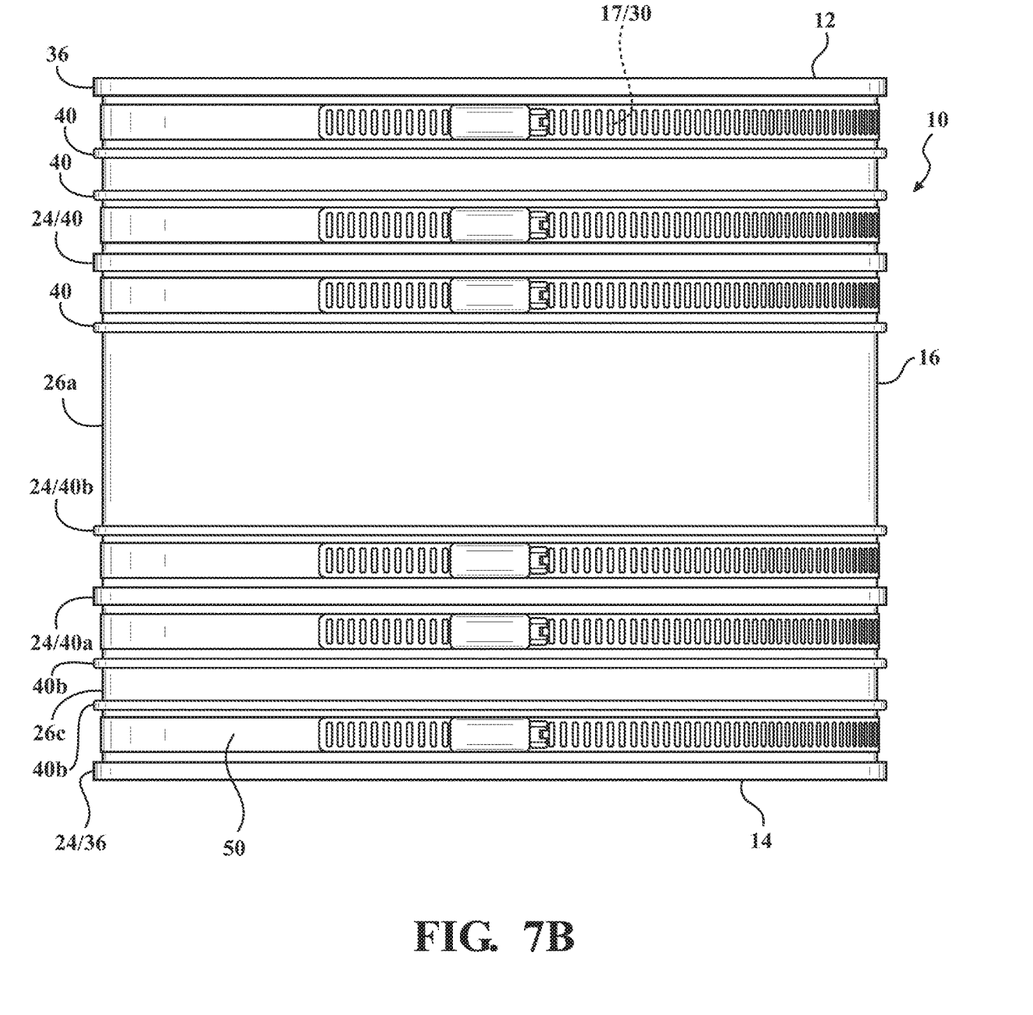
FIG. 7B is a side view of the pipe coupling apparatus including clamp bands.
Figure 8:
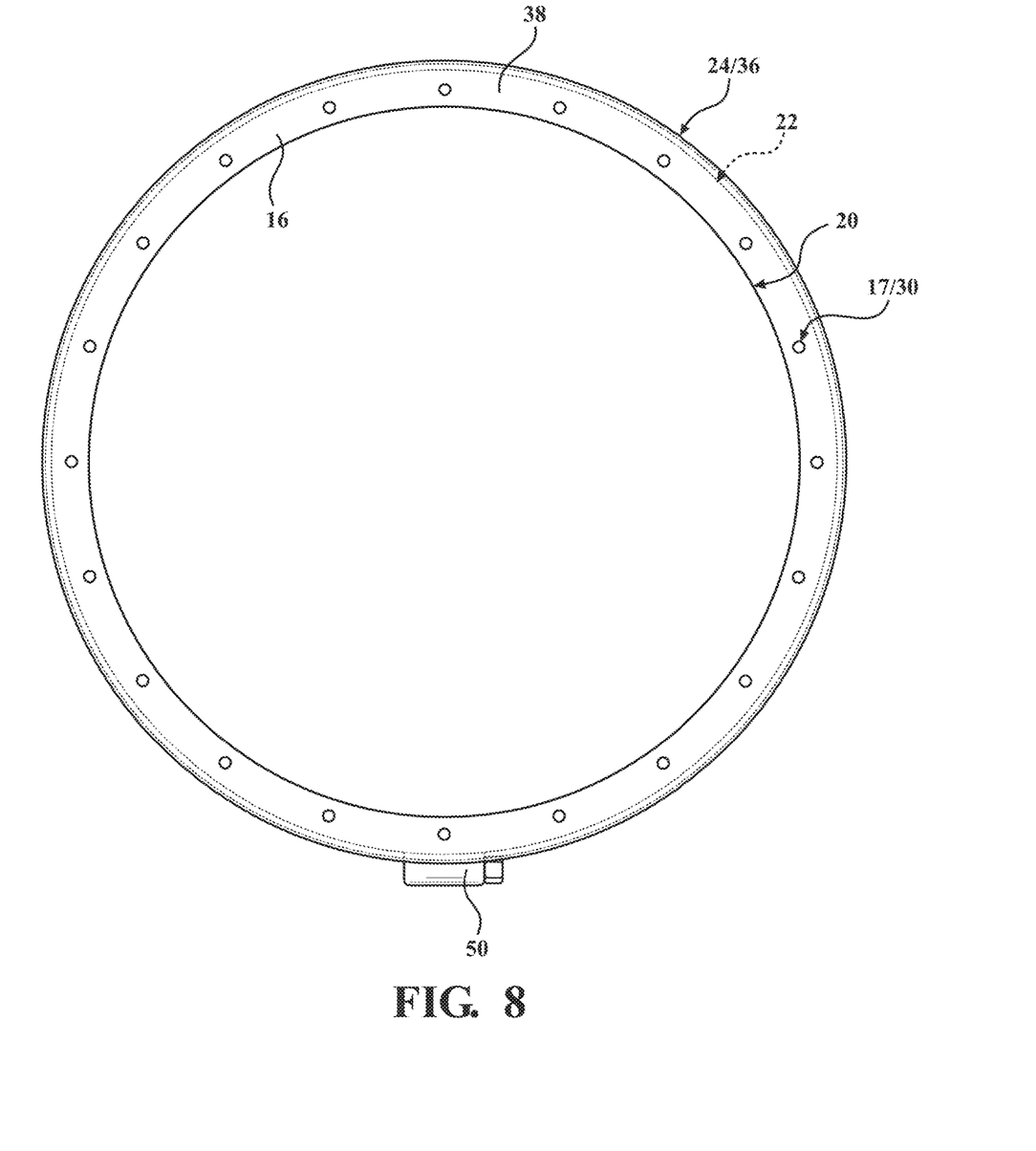
FIG. 8 is an end view of the pipe coupling apparatus including clamp bands.

In one aspect, the tube coupling apparatus 10 may be delivered and assembled to include the tubular body portion 16 along with the clamp bands 50 that are used to fix the tubular body portion 16 to the pipes that the apparatus 10 is intended to couple. An example of such a coupling apparatus 10 that includes the clamp bands 50 is shown in FIGS. 6-8. In one aspect, the apparatus 10 includes six clamp bands 50, each being disposed within one of the wide recesses 26*b*. The clamp bands 50 may be corrosion resistant, high torque stainless steel clamps configured to provide up to 120 inch/lbs of torque.

In one aspect, one clamp band 50 may be arranged adjacent the end flange 36, followed by an adjacent narrow recess 26*c*, followed by a pair of adjacent clamp bands 50, with flanges 24 disposed on both sides of each clamp band 50. The same arrangement may be used at the opposite end of the tubular body portion 16.

The clamp bands 50, when adjusted, may provide an adjustment in the diameter of the clamp bands 50. Accordingly, the clamp bands 50 may be adjusted to reduce their diameter. The clamp bands 50 are typically delivered in a nominal size, and may be adjusted to a nominal diameter of the tubular body portion 16 such that clamp bands 50 are retained axially between the flanges 24. In the above example, the clamp bands 50 may be disposed within the recesses 26 and between the flanges 24 when the clamp bands 50 have a diameter less than 11.30 inches (which is the outer diameter of the flanges 24), and preferably greater than 11.00 inches (the nominal outer diameter of the body portion 16 at the axial location of the recesses 26 in this example).

The clamp bands 50 may therefore be tightened to reduce the diameter of the of clamp bands 50, and thereby reduce the diameter of the tubular body portion 16 at the location of the clamp bands 50 that have been reduced. It will be appreciated that all of the clamp bands 50 may be tightened to different diameters, depending on the size of the pipes being coupled at each end.

The open narrow recess 26*c* disposed adjacent the axially outermost clamp band 50 may provide additional axial flexibility at this axial location. For example, the pipe being coupled may include a radial upset or the like, so it may be beneficial to have an axial location near the end of the tubular body portion 16 that does not include a clamp band such that the radial upset of the pipe may be disposed axial between the clamp bands 50 adjacent the narrow recess 26*c*.

The open narrow recess 26*c* as well as the intermediate recess 26*a* may also provide for a relief area for the radially compressed material disposed within the clamp bands 50. For example, when the clamps 50 are reduced in diameter and clamp down on the pipes, the material within the clamps 50 may tend to "flow" or be pushed axially outward from under the clamp and into an axially adjacent portion of the tubular body portion 16. Thus, when clamped, the open areas of the narrow recess 26*c* and the intermediate recess 26*a* may bulge radially outward relative to the adjacent clamped diameter.

The above example having the above recited arrangement and inner diameter of 10.00 inches may generally be used for pipes having an outer diameter of 10 to 8.4 inches, with the tubular body portion 16 being clamped down and reduced in diameter to accommodate the actual diameter of the pipe. It will be appreciated that other examples with different nominal inner diameters may be used for other size ranges of different size pipes.

The coupling apparatus 10 may be used on pipes that are the same diameter, such that each end is clamped down at approximately the same amount. The apparatus 10 may also be used for coupling pipes of different materials, where other coupling methods may be more difficult or cumbersome due to the nature of dissimilar materials. The apparatus 10 may also be used to couple pipes of different diameters, due to the variable nature of the clamping available at each end, and the flexibility of the tubular body portion 16.

Figure 3:
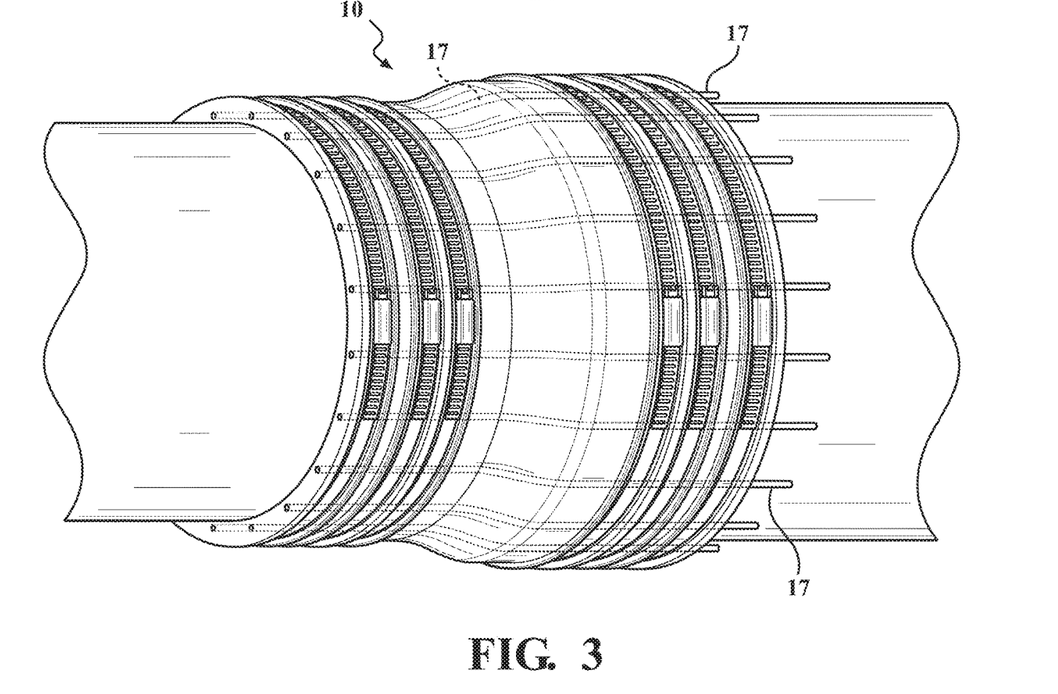
FIG. 3 is a perspective view of the pipe coupling apparatus connecting two pipes having different diameters.

In the case of coupling pipes of different diameters, one end of the tubular body portion 16 is clamped down a greater amount than the opposite end of the tubular body portion 16. Accordingly, the material of the tubular body portion 16 will flex and transition from one end to the other, as shown in FIG. 3. The middle of the tubular body portion 16 disposed at the intermediate recess 26*a* can therefore become tapered relative to the ends of the tubular body portion 16 that are clamped around the ends of the pipes. Tapering the area at the intermediate recess 26*a* can result in the material of the tubular body portion 16 being stretched and compressed in different locations.

The ability of the tubular body portion 16 to taper at the intermediate recess 26*a* is due to the different diameters of the pipes. Because the pipes may not line up as a butt joint, the tubular body portion 16 provides the sealing functionality to couple and connect the pipes. The flexible nature of the tubular body portion 16 allowing it to be clamped down and to taper may also allow the pipes to "bend" relative to each other, such that the axes of the pipes may not be aligned. The rods 17, however, provide a reinforcing structure to the tubular body portion 16, limiting the degree to which the pipes may shift or bend axially to each other. In one aspect, the rods 17 may ensure that the axes of the connected pipes are aligned, because it is often important to keep connected sections of pipe aligned.

In the above example, twenty rods 17 and cavities 30 are shown in use with the 10.00 inch inner diameter tubular body portion 16. It will be appreciated that other inner diameters may also be used. It will further be appreciated that additional rods 17 may be used in the above example to provide more rigidity and reinforcement, or that fewer rods 17 may be used to reduce rigidity and reinforcement. It will further be appreciated that different diameter tubular body portions 16 may have different quantities of rods 17 to affect the rigidity and reinforcement, as desired.

With the rods 17 being disposed within the material of the body portion 16, the clamp bands 50 may directly contact the tubular body portion 16, with no other structure or material disposed between the tubular body portion 16 and the clamp bands 50.

In one aspect, the inner surface 20 of the tubular body portion 16 may be free of ridges extending or projecting therefrom such that the inner surface 20 defines a generally smooth cylindrical surface. It will be appreciated that the inner surface 20 may include a measurable surface roughness, and that reference to smooth is intended to reference a generally constant diameter in a nominal state and is in reference to the lack of projections or other substantial structure on the inner surface 20. When disposed on the pipes, the inner surface 20 of the tubular body portion 16 may directly contact the pipes. In another approach, the inner surface 20 may include an annular flange projecting radially inward for acting as a central stop member.

As described above, different internal diameters for the tubular body portion 16 may be used for different sized tubular body portions to accommodate different pipe sizes, such as nominal pipe diameters of 4, 5, 6, 8, 10, or 12 inches, which may have different outer diameters. Thus, the ability of the tubular body portion 16 to be compressed can help attach pipes of various diameters. The various tubular body portions 16 having different diameters may have approximately the same overall length, for example 10 inches. Alternatively, the overall lengths may be different. In one aspect, a tubular body portion 16 with a smaller relative diameter may have a smaller relative length.

The above-described sizes of the flanges 24 and recesses 26 may also be different to accommodate the needs of the user. For example, the radial height of the flanges may be different, or the axial width of the recesses may be different. Similarly, additional flanges 24 may be included to define additional recesses 26 and/or additional clamp bands 50. Similarly, fewer flanges 24 may be used and/or fewer recesses 26. In one aspect, one or more of the recesses 26 may be axially wide enough to accommodate more than one clamp band 50.

It will further be appreciated that different size or configurations of clamp bands 50 may be used to provide more torque or less torque, depending on the clamping needs of the user.

The coupling apparatus 10 described herein may comply with various industrial standards, including ASTM C1173 and ASTM D5926. The apparatus 10 may be operable at different temperatures, such as a range of negative 30 degrees F. to 140 degrees F. As described above, the clamps may be stainless steel, such as 300SS. While the clamps 50 may be able to provide up to 120 inch/lbs, an installation force of 60 inch/lbs may also be sufficient.

When one end of the tubular body portion 16 is compressed more than the other, the portions of the rods 17 disposed at the more highly compressed and will be closed together relative to the portions of the rods 17 at the less compressed end. The rods 17, while providing rigidity and reinforcement to the tubular body portion 16, are still able to bend in response to relative clamping amounts at opposite ends. In one aspect, the rods 17 may have a diameter of 0.156 inches. However, it will be appreciated that the rods 17 may have a smaller diameter, enabling more flexibility, or the rods 17 may have a greater diameter to provide more rigidity.

When installed on the pipes, the inner surface 20 may directly contact the external surface of the pipes, thereby providing a seal and limiting leaks from the pipes and inhibiting intrusion of external matter. The coupling apparatus 10 may therefore operate as a universal coupling that may connect most pipe materials of various sizes. One coupling apparatus 10 per nominal size may therefore be used. The coupling apparatus 10 may be used on pipes made of clay, ductile iron, asbestos cement, cast iron, and plastic, as well as other materials.

The material of the tubular body portion 16, as described above, may be a flexible and resilient material. Thus, the material of the tubular body portion 16 biases the tubular body portion 16 to its nominal state. Upon clamping the ends of the tubular body portion 16, the tubular body portion 16 may have a clamped state. The rods 17 may become deformed in response to a sufficient clamping force that bends the rods 17 to cause plastic deformation. In such instances, the material of the tubular body portion 16 may still provide a radially outward biasing force toward the nominal state, but the deformation of the rods 17 may counteract this biasing force, leaving the tubular body portion 16 in a post-clamped state. However, the degree of clamping may fall short of plastically deforming the rods 17, and in such instances, the releasing the clamping force will return the tubular body portion 16 to a nominal state.

Thus, the pipe coupling apparatus described herein therefore provides for a robust coupling solution between various types of pipes.

Obviously, many modifications and variations of the present disclosure are possible in light of the above teachings and may be practiced otherwise than as specifically described while within the scope of the appended claims. These antecedent recitations should be interpreted to cover any combination in which the inventive novelty exercises its utility.

What is claimed is:

1. A pipe coupling apparatus comprising:
   a tubular body portion extending along a central axis from a first open end to a second open end to define an inner surface and an outer surface;
   the tubular body defining a plurality of axially extending cavities extending between the first and second open ends and disposed in circumferentially spaced relationship to one another;
   a plurality of rods extending axially through the tubular body portion and each disposed in a respective one of the plurality of axially extending cavities;
   a plurality of annular flanges projecting radially outward from the outer surface of the tubular body portion to define a plurality of annular recesses disposed axially between adjacent ones of the plurality of annular flanges;
   the plurality of annular flanges including a first set of flanges disposed adjacent the first open end to define a first set of recesses and a second set of flanges disposed adjacent the second open end to define a second set of recesses;
   a plurality of clamping bands disposed circumferentially around the tubular body portion and each disposed in one of the plurality of annular recesses, and wherein, within each of the first set of recesses and the second set of recesses, a quantity of clamping bands is fewer than a quantity of recesses.

2. The apparatus of claim 1, wherein each of the first and second sets of annular flanges have a first flange disposed adjacent the first open end or the second open end, respectively, a second flange, a third flange, and a fourth flange, wherein the second flange is disposed axially inward relative to the first flange, the third flange is disposed axially inward relative to the second flange, and the fourth flange is disposed axially inward relative to the third flange; and wherein each of the first and second set of recesses have a first recess, a second recess, and a third recess, wherein the first recess is disposed axially between the first flange and the second flange, the second recess is disposed axially between the second flange and the third flange, and the third recess is disposed axially between the third flange and the fourth flange.

3. The apparatus of claim 2, wherein a first clamping band of the plurality of clamping bands is disposed in the first recess, and a second clamping band of the plurality of clamping bands is disposed in the third recess, and the second recess does not include a clamping band.

4. The apparatus of claim 1, wherein the plurality of clamping bands directly contact the outer surface of the tubular body portion.

5. The apparatus of claim 1, wherein the inner surface is substantially smooth and free from radial projections.

6. The apparatus of claim 1, wherein the rods are comprised of metal.

7. The apparatus of claim 1, wherein the tubular body portion has a nominal state and a compressed state, wherein in the compressed state an outer diameter of the tubular body portion is reduced relative to the nominal state.

8. The apparatus of claim 7, wherein in the compressed state, the outer diameter of the tubular body portion at one end is different than the outer diameter at the opposite end.

9. The apparatus of claim 1, wherein the plurality of rods are axially moveable relative to the plurality of cavities in response to radial compression of at least one end of the tubular body portion.

10. The apparatus of claim 2, wherein the second recess has a narrower axial width being less than a wider axial width of the first and second recesses.

11. The apparatus of claim 10, wherein each of the first and second sets of flanges include a fifth flange disposed axially inward relative to the fourth flange, and each of the first and second sets of recesses include a fourth recess disposed axially between the fourth flange and the fifth flange.

12. The apparatus of claim 11, wherein the fourth recess has an axial width being equal to the wider axial width of the first and second recesses, and a clamping band of the plurality of clamping bands is disposed within the fourth recess.

13. The apparatus of claim 2, wherein the plurality of flanges defines an intermediate recess disposed at an axial midpoint of the tubular body portion between the first and second sets of recesses, wherein the intermediate recess has an intermediate axial width that is greater than axial widths of the first, second, and third recesses, and wherein the tubular body portion tapers at the intermediate recess when one end of the tubular body portion is radially compressed a greater amount than the opposite end of the tubular body portion.

14. A pipe coupling apparatus comprising:
a tubular body portion extending along a central axis from a first open end to a second open end to define an inner surface and an outer surface;
the tubular body defining a plurality of axially extending cavities extending between the first and second open ends and disposed in circumferentially spaced relationship to one another;
a plurality of rods extending axially through the tubular body portion and each disposed in a respective one of the plurality of axially extending cavities;
a plurality of annular flanges projecting radially outward from the outer surface of the tubular body portion to define a plurality of annular recesses disposed axially between adjacent ones of the plurality of annular flanges;
the plurality of annular flanges including a first set of flanges disposed adjacent the first open end to define a first set of recesses and a second set of flanges disposed adjacent the second open end to define a second set of recesses;
wherein each of the first and second set of recesses includes at least one narrow recess having a narrow axial width being less than a wider axial width of the remaining recesses in the respective set of recesses.

15. The apparatus of claim 14, wherein each of the first and second sets of annular flanges have a first flange disposed adjacent the first open end or the second open end, respectively, a second flange, a third flange, and a fourth flange, wherein the second flange is disposed axially inward relative to the first flange, the third flange is disposed axially inward relative to the second flange, and the fourth flange is disposed axially inward relative to the third flange; and
wherein each of the first and second set of recesses have a first recess, a second recess, and a third recess, wherein the first recess is disposed axially between the first flange and the second flange, the second recess is disposed axially between the second flange and the third flange, and the third recess is disposed axially between the third flange and the fourth flange.

16. The apparatus of claim 15, wherein the second recess in each of the first and second sets of recesses has the narrower width, and the first and third recesses have the wider axial width.

17. The apparatus of claim 16, wherein each of the first and second sets of flanges include a fifth flange disposed axially inward relative to the fourth flange, and each of the first and second sets of recesses include a fourth recess disposed axially between the fourth flange and the fifth flange, and the fourth recess has the wider axial width.

18. The apparatus of claim 15, wherein the plurality of flanges defines an intermediate recess disposed at an axial midpoint of the tubular body portion between the first and second sets of recesses, wherein the intermediate recess has an intermediate axial width that is greater than axial widths of the first, second, and third recesses.

19. A method of coupling two pipes, the method comprising the steps of:
providing a first pipe having a first outer diameter;
providing a second pipe having a second outer diameter;
disposing a pipe coupling apparatus over ends of the first pipe and the second pipe, wherein the pipe coupling apparatus includes a tubular body portion having a central axis extending from a first open end to a second open end and a first and second end, the tubular body portion defining a plurality of cavities extending between the first and second open ends and disposed in circumferentially spaced relationship to one another, a plurality of rods extending axially through the body portion and each disposed within a respective one of the cavities, and a plurality of flanges extending radially outward from the body portion to define a plurality of recesses axially therebetween;
tightening at least a first clamp and radially compressing the first end of the tubular body portion against the end of the first pipe;
tightening at least a second clamp and radially compressing the second end of the tubular body portion against the end of the second pipe;

wherein the first and second clamps are disposed within a corresponding recess of the plurality of recesses; and
wherein at least one of the recesses of the plurality of recesses does not include a clamp.

20. The method of claim 19, wherein the plurality of rods bend and an intermediate portion of the tubular body portion is tapered when the first end is radially compressed a greater amount relative to the second end.

* * * * *